Aug. 5, 1958     L. H. FLECK ET AL     2,846,334
METHOD OF RECONDITIONING EXPOSED AND
DEVELOPED PHOTOGRAPHIC FILM
Filed March 23, 1953

COILED SRUNKEN AND BRITTLE PHOTOGRAPHIC FILM
|
VACUUM CHAMBER
|
CAMPHOR, ALCOHOL AND EUCALYPTUS VAPORIZED
|
WATER AND GLYCERINE VAPORIZED
|
RETAINED SEVERAL HOURS IN VACUUM
|
RECONDITIONED FILM REMOVED

INVENTORS
LUCILE H. FLECK
BY    SAMUEL H. BUNCHEZ

ATTORNEY

United States Patent Office 2,846,334
Patented Aug. 5, 1958

2,846,334

METHOD OF RECONDITIONING EXPOSED AND DEVELOPED PHOTOGRAPHIC FILM

Lucile H. Fleck and Samuel H. Bunchez, New York, N. Y.

Application March 23, 1953, Serial No. 344,248

1 Claim. (Cl. 117—63)

The present invention relates to method of treating photographic film and, more especially, to a method of reconditioning exposed and developed photographic film which has become shrunken and brittle during storage.

A primary object of the invention is the provision of a method of treating film which has shrunken so badly that it will not go through a film printer without damage, the treatment resulting in reduction of film shrinkage so that prints may readily be made from the film.

Another object of the invention is the provision of a method of treating film which has become brittle so that it cannot be put through a projector and restoring the brittle film to such condition that it may be readily projected.

Improper conditioning of new film and undesirable storage conditions contribute to destroy the usefulness of stored film because of the drying out of the plasticizers in the film emulsion and shrinkage of the length and width of the film base to such an extent as to prevent duplication or projection of the film in a contact printer or projector. All too frequently valuable prints or negatives which have been stored for too long a time under undesirable conditions will break up, rip and crack when it is attempted to pass them through a film projector or printer. It becomes necessary, therefore, to prevent the total loss of such dried out, brittle and shrunken film by reconditioning the film in such a manner as to effectively reintroduce into the film moistening agents, plasticizers and gelatin softeners.

Heretofore, it has been attempted to recondition dried out, brittle and shrunken film by applying oils to the surface of the film, or by using an application of glycerine in alcohol, or by soaking the film in a solution of glycerine in water. However, all of these procedures involved the unwinding of the film prior to treatment and in the course of the unwinding the film would crack and break. Moreover, in most cases, cleaning of the film was necessary to remove excess oil or glycerine deposits.

In accordance with the present invention coiled film is treated on the original reels without unwinding. The coiled reels of film are placed in a chamber under vacuum and are subjected to the action of a treating solution in vaporized form. The vaporized treating agent acts upon the film and serves to soften it and restore some of its lost plasticizer, thereby reducing shrinkage and brittleness.

The solution employed for treating the film has as its principal ingredients a plasticizer and a gelatin softener. A suitable plasticizer is glycerine and a suitable gelatin softener is camphor. A suitable film lubricant such as eucalyptus oil is also preferably included in the treating solution.

The camphor not only acts as a gelatine softener in conjunction with the eucalyptus oil, but it also acts as a plasticizer for the cellulose esters in the base. Instead of eucalyptus oil, oil of turpentine may be added.

The following examples are given to illustrate the practice of the invention.

*Example 1*

The original coiled reels of film are placed on trays or racks without unwinding. The trays of film are placed in a treating chamber. The treating chamber is connected to a vacuum pump and is provided with a plurality of thermostatically controlled vaporization pipes.

The treating chamber is then hermetically sealed, the vacuum pump is turned on and a vacuum is drawn to within 1/8 to 1/4 of an inch of barometric pressure.

The treating solution may be produced according to the following formula:

Mixture A: Dissolve 5 grams of camphor in 5 oz. of alcohol at 78° F., add this to 5 oz. of oil of eucalyptus.

Mixture B: To 6 parts of distilled water at 95° F. add 4 parts glycerine.

First, about 10 oz. of Mixture A is introduced into the vaporizing pipes. After about 30 minutes, 10 oz. of Mixture B is introduced into the vaporizing pipes. The solutions are vaporized in the pipes and the vapors enter the chamber and react on the film. The temperature controls of the vaporizing pipes are turned off and the apparatus is permitted to cool to room temperature. The film is left in the vacuum chamber for a period of from 12 to 15 hours.

By the above procedure and the reaction of the treating vapors on the film under vacuum, the film is rehumidified and the lost plasticizers are replaced with molecules of glycerine and terpene to give the film flexibility and softness and reduce shrinkage.

*Example 2*

The coiled reels of film are placed in the vacuum chamber wherein a temperature of 90° to 100° F. is maintained. The chamber is evacuated and the film is subjected to the vaporized solution as in Example 1. The film is left in the vacuum chamber for a period of approximately three hours.

The accompanying flow sheet indicates diagrammatically the detailed steps of the process.

Since certain modifications may be made in the method of the present invention without departing from the scope thereof, it is intended that all matters contained in the foregoing specification be interpreted merely as illustrative and not in a limiting sense.

What is claimed is:

The process of treating coils of cellulose ester base photographic film to restore its flexibility which consists in exhausting the air to about 1/4 inch barometric pressure in a chamber containing the still coiled films, vaporizing about equal parts of camphor and alcohol and oil of eucalyptus in a pipe, delivering the vapor into the vacuum chamber at about 78° F., about half an hour later vaporizing a mixture of about six parts of distilled water and about four parts of glycerine in a pipe and delivering it to the chamber, closing the pipes, and leaving the film in the chamber for upwards of 3 hours.

References Cited in the file of this patent

UNITED STATES PATENTS

| | | |
|---|---|---|
| 1,633,576 | Franks | June 28, 1927 |
| 1,657,870 | Sherts | Jan. 31, 1928 |
| 1,861,918 | Hickman | June 7, 1932 |
| 1,997,269 | Stewart | Apr. 9, 1935 |
| 2,020,303 | Dreyfus | Nov. 12, 1935 |
| 2,034,713 | Dreyfus | Mar. 24, 1936 |
| 2,158,219 | Claus | May 16, 1939 |
| 2,256,356 | Russell | Sept. 16, 1941 |
| 2,271,192 | Hinz | Jan. 27, 1942 |
| 2,326,189 | Whitehead | Aug. 10, 1943 |
| 2,380,003 | Whitehead | July 10, 1945 |
| 2,584,043 | Oberly | Jan. 29, 1952 |
| 2,782,697 | Krupa | Feb. 26, 1957 |